July 27, 1965
W. H. McLELLAN
3,196,668
DUAL SEMICONDUCTOR STRAIN GAUGES
Filed March 26, 1962
2 Sheets-Sheet 1
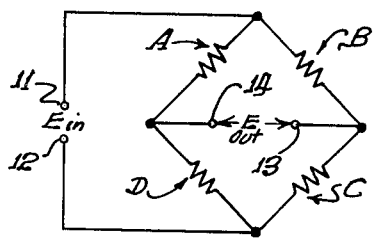
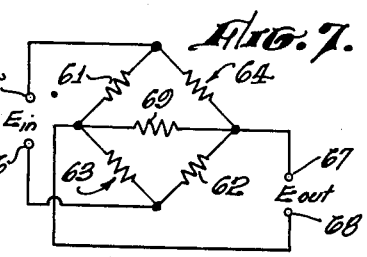
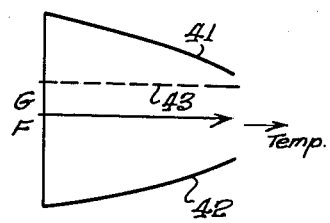
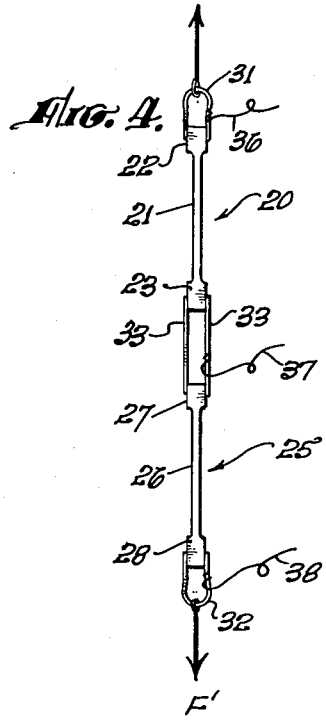
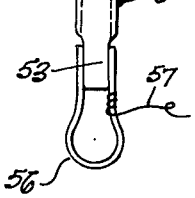
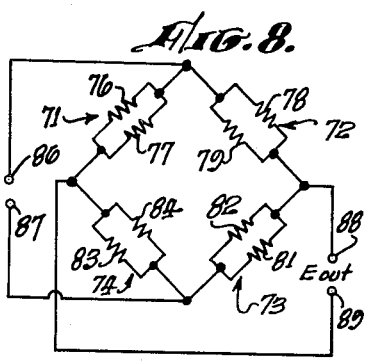
WILLIAM H. McLELLAN,
INVENTOR.
BY HIS ATTORNEYS.
Spensley & Horn.

July 27, 1965  W. H. McLELLAN  3,196,668
DUAL SEMICONDUCTOR STRAIN GAUGES
Filed March 26, 1962  2 Sheets-Sheet 2

Inventor.
WILLIAM H. McLELLAN,
By His Attorneys Spensley & Horn.

United States Patent Office 3,196,668
Patented July 27, 1965

3,196,668
DUAL SEMICONDUCTOR STRAIN GAUGES
William H. McLellan, Pasadena, Calif., assignor to
Electro-Optical Systems, Inc., Pasadena, Calif., a
corporation of California
Filed Mar. 26, 1962, Ser. No. 183,336
5 Claims. (Cl. 73—88.5)

This invention relates to strain-electric translating elements and more particularly to semiconductor strain gauges utilizing two gauge elements of opposite conductivity types.

The present invention strain gauges further relate to and may be employed in various types of transducers, such as motion sensing devices, accelerometers and other instruments for measuring movements, forces and pressures. Strain gauge elements are employed in two basic configurations, bonded and unbonded; the present invention is applicable to both types.

Prior art strain gauges typically employ strain sensitive wire as the translating element. Recently, the use of semiconductor elements has been adopted. The element, whether metal or semiconductor, when subjected to tension, changes in dimension and electrical resistivity and therefore in overall resistance. Measurement of the change in resistance enables determination of the magnitude of the applied force producing the tension. The phenomenon of a change in resistivity resulting from an applied stress is termed the piezoresitance effect.

A thin rod or bar of any material exhibiting a sufficient piezoresistance effect can be used in a manner similar to that of the well known prior art wire strain gauges. Young's modulus, E, relates the change in stress to the strain by the equation, $$E = \frac{S}{\epsilon}$$

where S represents stress and $\epsilon$ represents strain. In a crystalline material such as silicon, E varies with direction. $\epsilon$, in the above equation, is the longitudinal strain resulting from simple longitudinal stress, S, assuming no stress in the transverse direction. The fractional change in resistivity due to stress S is $$\frac{\Delta \rho}{\rho} = \pi S$$

where $\pi$ is the longitudinal piezoresistance coefficient and where $\rho$ represents the resistivity of the material. Thus, $$\frac{\Delta \rho}{\rho} = \pi \epsilon E$$

This can be written as $M\epsilon$, where M is defined as $\pi E$.

Since for a rod of any material $R = \rho L/A$, where R is the resistance of the rod, $\rho$ its resistivity, L its length and A its cross-sectional area, it can be shown, for a simple case that $$\frac{\Delta R}{R} = (1 + 2\delta + M) \epsilon$$

$\delta$ Denotes Poisson's ratio; i.e., the ratio of the magnitude of transverse strain to longitudinal strain resulting from the postulated simple stress S. In the above equation, the first term on the right expresses the resistance change due to change in length; the second term is due to the change in area; and, the third term is due to the resistivity change. The factor $$K = \frac{\Delta R}{R \epsilon} = 1 + 2\delta + M$$

is called the gauge factor. Most of the commonly used wire strain gauges have a gauge factor of between 2 and 4.

The piezoresistance effect in semiconductor materials, including silicon and germanium, varies with crystallographic orientation and is particularly pronounced for certain crystllographic orientations. For example, P type silicon of [100] crystallographic orientation has a gauge factor similar to that of wire strain gauges, while P type silicon of [111] crystallographic orientation has a gauge factor within the range of from about 70 to about 200. N type silicon of [111] crystallographic orientation exhibits a low gauge factor and N type silicon of [100] crystallographic orientation exhibits a high gauge factor comparable to that of P type silicon of [111] crystallographic orientation. Germanium may also exhibit a high gauge factor, dependent upon orientation and conductivity type. Thus, it is apparent that the use of semiconductor crystals of predetermined conductivity type and crystallographic orientation as strain-electric translating elements can provide an increase in sensitivity of up to 100:1 over ordinary materials.

Prior art metallic strain gauges, which are typically wire, have a relatively low gauge factor as indicated above. Further, the output signals produced by such gauges and the signal-to-noise ratio are both relatively low. Additionally, the accuracy of such prior art strain gauges is effected by hysteresis due to plastic and metallic flow. The mechanical stability of such wire strain gauge elements is relatively poor and the resistivity low.

The use of unitary semiconductor crystals has overcome most of the disadvantages of the prior art strain-electric translating elements. However, semiconductor strain gauge elements are not without certain disadvantages of their own. As is well known to those skilled in the art, various semiconductor crystal gauge elements exhibit substantial changes in resistance with changes in temperature, the changes of resistance with temperature not always being linear over wide ranges of temperature. When utilizing semiconductor crystal elements of the same conductivity type in opposite arms of the commonly used Wheatstone bridge circuit, the zero balance of the bridge is upset upon changes in temperature. In an attempt to provide temperature compensation of zero balance, thermistors are frequently connected across the semiconductor elements in the opposite bridge arms. However, the use of thermistors in this fashion produces the undesirable result of making the bridge output more temperature dependent because the effect of temperature then varies the electrical load on the gauges so that the load is greatest when the output is lowest. It is therefore desirable to provide for the use of semiconductor strain gauges in a bridge circuit wherein resistance changes due to temperature variation do not unbalance the bridge.

Another characteristic of semiconductor crystal strain-electric translating elements is a variation in gauge factor with variations in temperature. It is desirable in certain applications to provide semiconductor strain gauges, the gauge factors of which are relatively insensitive to temperature changes.

Accordingly, it is an object of the present invention to provide improved semiconductor strain gauges.

It is also an object of the present invention to provide semiconductor strain gauges suitable for use in a two-active arm bridge circuit wherein the bridge output is relatively insensitive to temperature changes.

It is another object of the present invention to provide semiconductor strain gauges having a gauge factor relatively insensitive to temperature.

It is a further object of the present invention to provide improved semiconductor strain gauges which, when used in a four-active arm bridge circuit, provide a high output while being relatively insensitive to temperature changes.

The objects of the present invention are accomplished in general by semiconductor strain gauges utilizing two gauge elements of opposing conductivity types. In accordance with a first concept of the present invention, two semiconductor gauge elements of opposite conductivity types are utilized in adjacent arms of a two-active arm bridge circuit, in contrast to the usual method of using two gauge elements of like conductivity type in opposite bridge arms. The present invention bridge circuit is characterized by high output and temperature compensation of zero balance, high output being achieved by proper crystallographic orientation and temperature compensation of zero balance being achieved by matching of the gauge element resistivities. The gauge elements are selected to have identical positive temperature coefficients and the resistivities are matched to give identical rates of resistance change with variation in temperature. Therefore, resistance changes due to temperature variation do not unbalance the bridge since the rate of resistance change in the adjacent active bridge arms is equal. In accordance with a second concept of the present invention, a semi-conductor strain gauge utilizing two gauge elements of opposite conductivity provides a strain gauge having a gauge factor relatively insensitive to temperature changes, the desired characteristic being obtained by the proper choice of material for the gauge element and the electrical connection of the gauge elements in parallel. Of course, in both of the aforementioned applications, the two gauge elements must be subjected to identical tensile stresses.

The novel features which are believed to be characteristic of the invention, both as to its organization and method of operation, together with further objects and advantages thereof will be better understood from the following description considered in connection with the accompanying drawings in which a presently preferred embodiment of the invention is illustrated by way of example. It is to be expressly understood, however, that the drawing is for the purpose of illustration and description only, and is not intended as a definition of the limits of the invention.

In the drawing:

FIGURE 1 is a schematic diagram of a Wheatstone bridge circuit;

FIGURE 4 is a plan view of one embodiment of a dual semi-conductor strain gauge with the gauge elements connected in series;

FIGURE 5 is a graph showing strain gauge factor plotted as a function of temperature for exemplary strain gauge elements;

FIGURE 6 is a plan view of a dual semiconductor strain gauge with the gauge elements connected in parallel;

FIGURE 7 is a schematic diagram showing a modified form of a Wheatstone bridge circuit; and, FIGURE 8 is a schematic diagram showing another modified form of a Wheatstone bridge circuit.

Figure 2:
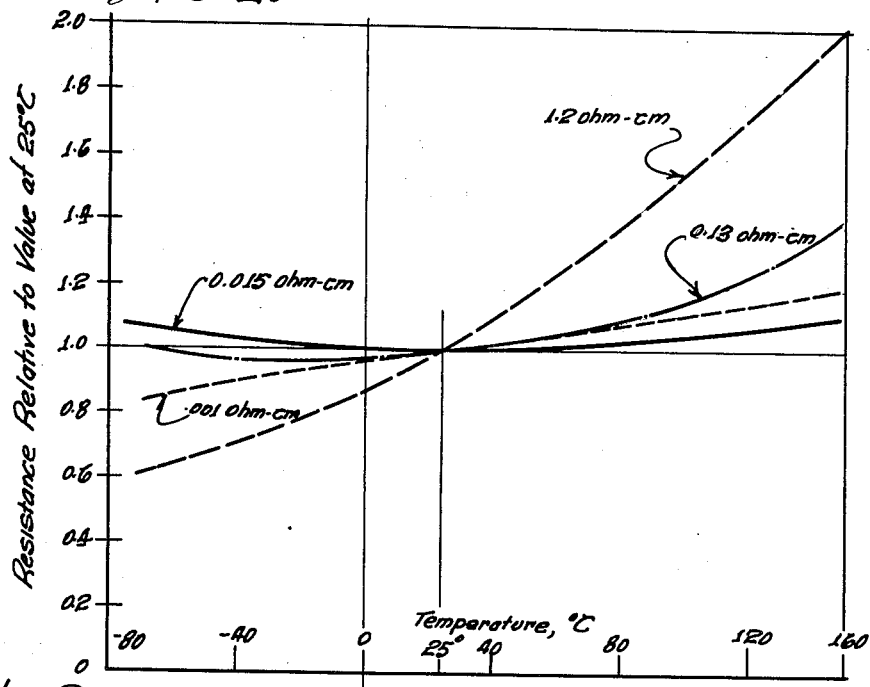
FIGURE 2 is a graph showing relative resistance plotted against temperature for P type silicon of [111] crystallographic orientation.

Referring now to the drawings, and more particularly to FIGURE 1 thereof, there is shown the schematic diagram of the well known Wheatstone bridge circuit, including resistances A, B, C and D. The junction between the resistances A and B is connected to an input terminal 11, the junction between the resistances C and D being connected to another input terminal 12. The junction between the resistances B and C is connected to an output terminal 13, the junction between the resistances D and A being connected to another output terminal 14. A battery or other suitable source of electrical potential is connected between the input terminals 11 and 12 to provide the bridge input voltage, $E_{in}$. An electrical meter or other suitable electrical indicating instrument is connected between the output terminals 13 and 14 to measure the bridge output voltage, $E_{out}$. The basic Wheatstone bridge circuit of FIGURE 1 is, in accordance with present art practice, utilized in conjunction with semiconductor strain gauges of identical conductivity type positioned in opposing legs of the bridge circuit. For example, in a typical application, the resistances A and C will be semiconductor strain gauge elements of the same conductivity type, while resistances B and D will be fixed resistors. The bridge is balanced for zero output with no strain on the semiconductor strain gauges by adjustment of the resistance values of the resistors B and D. When the semiconductor strain gauge elements used as the resistances A and C are subjected to the same stress, their resistances will change due to the piezoresistance effect and a bridge output voltage will be produced. Measurement of the bridge output voltage provides an indication of the strain to which the semiconductor gauges are subjected. By utilizing semiconductor strain gauge elements of proper crystallographic orientation a relatively high bridge output will be obtained. However, the use of the basic Wheatstone bridge circuit in this manner is presently limited by the positive temperature coefficient of resistance characteristics of the commonly used semiconductor strain gauge elements. Changes in temperature from the temperature at which the bridge is balanced for zero output will tend to upset the balance and so produce erroneous strain ratings. And, as pointed out hereinabove, the usual method of connecting thermistors across the semiconductor gauge elements to provide temperature compensation of zero balance produces the undesirable result of making the bridge output more temperature dependent. In accordance with the first concept of the present invention, semiconductor crystal elements of the same positive temperature coefficient, but of opposing conductivity types, are utilized in adjacent legs of the bridge circuit. For example, a gauge element of P type silicon can be used as the resistance A in the circuit of FIGURE 1 and an element of N type silicon used as the resistance B, the resistances C and D being ordinary resistors. A high bridge output can be obtained by utilizing a P type silicon element of [111] crystallographic orientation and an N type silicon element of [100] crystallographic orientation, the resistivities of the gauge elements being matched to give identical rates of resistance change with variation in temperature.

Figure 3:
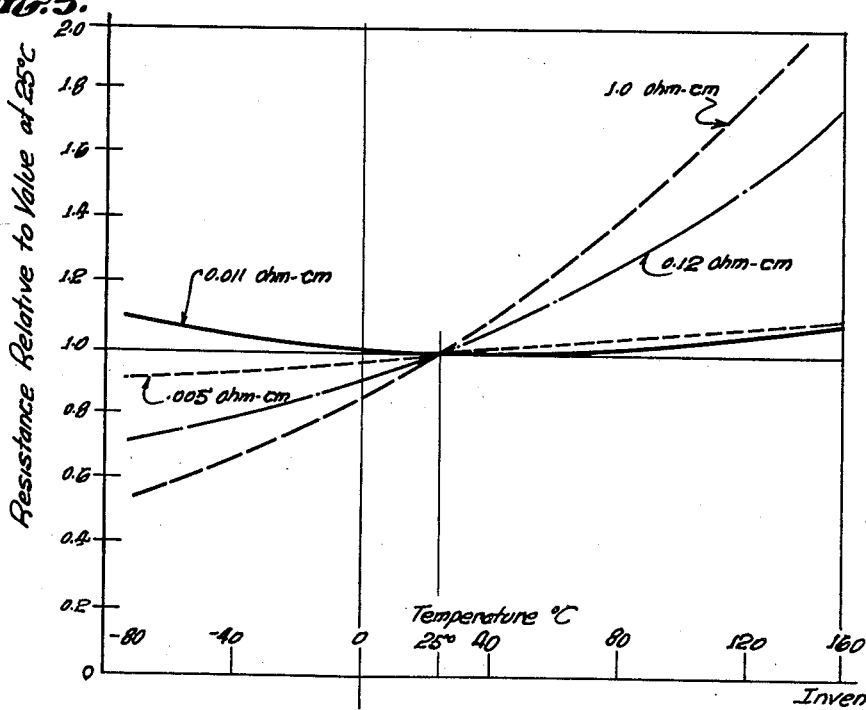
FIGURE 3 is a graph showing relative resistance plotted against temperature for N type silicon of [100] crystallographic orientation.

FIGURES 2 and 3 of the drawing are graphs illustrating the variation of resistance with temperature for P and N type silicon elements of various resistivities. The axes of ordinates are calibrated in terms of resistance relative to the resistance value of each element at 25° C. room temperature. Thus, at room temperature, each element has a relative resistance value of one. The relative resistance values are plotted as a function of temperature, the axes of abscissas being calibrated in degrees centigrade. The graph of FIGURE 2 plots these characteristics for exemplary P type silicon elements of [111] crystallographic orientation and of different resistivities ranging from 0.001 ohm-cm. to 1.2 ohm-cm. The graph of FIGURE 3 plots these characteristics for exemplary N type silicon elements of [100] crystallographic orientation and of different resistivities ranging from 0.005 ohm-cm. to 1.0 ohm-cm. The comparison of the graphs of FIGURES 2 and 3 to enable selection of P and N gauge elements having similar temperature dependences shows that, for these particular exemplary elements, the P type silicon element of 0.015 ohm-cm. resistivity will closely match the N type silicon element of 0.011 ohm-cm. resistivity throughout the illustrated temperature range. It is to be emphasized that these curves are for particular individual crystal specimens, and that different specimens of the same material, conductivity type, crystallographic orientation and resistivity might exhibit quite different temperature dependent curves. Hence, the gauge elements must be individually matched for each particular application. For example, for some certain specimens, a P type silicon element having a [111] crystallographic orientation and a resistivity of 0.1 ohm-cm. might be found to exhibit the same temperature dependence of resistance as as certain N type silicon element having a [100] crystallographic orientation and a resistivity of 0.005 ohm-cm. However, it can be expected that from about 0.015 ohm-cm. resistivity and lower, the N type and P type silicon elements of the aforementioned crystallographic orientation will have similar temperature dependent properties if the resistivities are substantially equal, or if the resistivity of the N type element is only slightly lower than that of the P type element. Because of the uncertainty of the correlation between the resistivity and temperature dependence, it is necessary to determine the correlation for each gauge element and individually match the gauges.

For the particular individual gauge elements, the temperature dependences of which are plotted in FIGURES 2 and 3, it is seen that the P type silicon gauge of 0.015 ohm-cm. resistivity provides the proper close match for the N type silicon gauge of 0.011 ohm-cm. resistivity. These two selected specimens are then fabricated into semiconductor strain gauge elements of an identical predetermined resistance. Because of the slight difference in resistivities between the N and P type specimens, it is readily apparent that the strain gauge element fabricated from the N type silicon specimen will be slightly larger than that fabricated from the P type silicon specimen in accordance with the above-defined relationship $$R = \frac{\rho L}{A}$$

For example, if it is desired to fabricate the strain gauge elements in the form of rods having uniform and equal cross-sectional areas, so that when the elements are subjected to the same axial loading they will be identically stressed, the N type silicon rod must be approximately 36% longer than the P type silicon rod in order that both of the gauge elements will be of the same resistance. It is therefore desirable, as a matter of practicality, to match up gauges having similar resistivities so that there will not be a great disparity in the physical sizes of the gauge elements for equal gauge resistances.

Turning now to FIGURE 4 of the drawing, there is shown an illustrative structural embodiment of a series connected dual semi-conductor strain gauge in accordance with the hereinabove explained first concept of the present invention. The gauge consists of a generally dumbbell shaped gauge element 20 of P type silicon connected end-to-end with a generally dumbbell shaped gauge element 25 of N type silicon. For maximum output the P type silicon gauge element 20 should be of [111] crystallographic orientation and the N type silicon gauge element 25 of [100] crystallographic orientation. The gauge element 20 defines a reduced diameter main body portion 21 and enlarged end portions 22 and 23. The gauge element 25 defines a main body portion 26 of reduced diameter and enlarged end portions 27 and 28. A coupling loop 31 is similarly provided at the end portion 28 of the gauge element 25. The gauge elements 20 and 25 are coupled in end-to-end relationship by a pair of gold wires 33 and 34 alloyed to the end portions 23 and 27. Thus, both of the gauge elements 20 and 25 will be subjected to the same loading when oppositely directed, longitudinal forces F and F' are applied respectively to the coupling loops 31 and 32. Electrical connection to the gauge elements are provided by filamentary gold connecting leads 36, 37 and 38. One end of the lead 36 is ohmically bonded to the coupling loop 31 to provide electrical connection to the end portion 22 of the gauge element 20. One end of the lead 38 is ohmically bonded to the coupling loop 32 to provide electrical connection to the end portion 28 of the gauge 25. One end of the lead 37 is ohmically bonded to the wire 34 to provide electrical connection to the end portion 23 of the gauge 20 and the end portion 27 of the gauge 25. Correlating the strain gauge structure of FIGURE 4 with the schematic Wheatstone bridge diagram of FIGURE 1, the gauge 20 may be connected as the resistance A with the lead 36 connected to the output terminal 14 in FIGURE 1 and the lead 37 connected to the input terminal 11 of FIGURE 1. The gauge element 25 will then correspond to the resistance B in the diagram of FIGURE 1, with the electrical lead 38 being connected to the output terminal 13 of FIGURE 1.

The strain gauge embodiment of FIGURE 4 is of the unbonded type, the two strain gauge elements 20 and 25 being maintained in end-to-end relationship so that they are both subjected to the same longitudinal stress, assuming that their main body portions are of identical cross-sectional area. However, it is readily apparent that the matched P and N type gauges in accordance with the first concept of the present invention may be utilized in a bonded type of strain gauge, it merely being necessary to maintain the two gauge elements in parallel alignment so that they are both subjected to the same axial loading in either tension or compression. The embodiment of FIGURE 4 is shown merely for the purpose of illustration and any one of the many other well known gauge configurations is equally suitable. Also, although the crystallographic orientations which provide the highest gauge factor are utilized in the illustrated embodiment, other crystallographic orientations are equally feasible, although the bridge output will not be as high.

The hereinabove discussed first concept of the present invention involved the use of two semiconductor strain gauge elements, a gauge element of P type semiconductor material being electrically connected in series with a gauge element of N type semiconductor material, the gauge elements being utilized in adjacent arms of a two-active arm bridge circuit. In accordance with the second present invention concept, two gauge elements are electrically connected in parallel to provide a semiconductor strain gauge having a gauge factor relatively independent of temperature, one of the gauge elements being of P type semiconductor material and the other gauge element being of N type semiconductor material. The gauge factor of a strain gauge utilizing a single gauge element of a semiconductor material will change with temperature variations as a result of the temperature dependence of resistivity for the gauge material. For example, strain gauge elements fabricated of silicon crystals typically exhibit a positive temperature coefficient of resistance. A gauge element fabricated from P type silicon has a positive strain gauge factor and one fabricated from N type silicon has a negative strain gauge factor. The term "positive gauge factor," as used herein, refers to a strain gauge element whose resistance increases upon application of a tensile stress. Conversely, the term "negative gauge factor" refers to a strain gauge element whose resistance decreases upon application of a tensile stress. The positive gauge factor of a P type silicon gauge element usually decreases with an increase in temperature, while the negative gauge factor of an N type silicon element usually increases with an increase in temperature, i.e., becomes less negative. By selecting an N type silicon gauge element whose gauge factor increases with temperature at the same rate that the gauge factor of a particular P type silicon element decreases with temperature, electrical interconnection of these two gauge elements in parallel will provide a dual strain gauge having a resultant gauge factor relatively insensitive to temperature changes.

Since semiconductor strain gauge elements are both strain sensitive and temperature sensitive, a crystallographic orientation and impurity concentration can be chosen to emphasize one effect and to minimize the other. When attempting to provide a dual strain gauge utilizing parallel connected P and N type semiconductor gauge elements to create a resultant strain gauge factor which is relatively insensitive to temperature, it may be necessary to utilize crystallographic orientation other than the ones which provide the maximum gauge factor for each of the two gauge elements, stabilization of the resultant gauge factor being the primary consideration rather than high gauge output. Among the factors determining the variation in gauge factor with temperature for semiconductor strain gauge elements, the most readily controllable are the crystallographic orientation and the resistivity. Because of the many factors controlling the temperature dependence of gauge factor for semiconductor gauge elements, it is necessary to test each crystal specimen to determine its temperature dependence of gauge factor and to individually match a P type semiconductor specimen with a complementary N type semiconductor specimen. In FIGURE 5 of the drawing, there is shown a graph plotting gauge factor as a function of temperature for two suitably matched exemplary semiconductor gauge elements. The curve 41 represents the variation in gauge factor with temperature for a particular P type silicon gauge element. The curve 42 represents the variation in gauge factor with temperature for a particular N type silicon gauge element. The dashed line 43 represents the resultant gauge factor obtained when the gauge elements whose gauge factors are plotted in curves 41 and 42 are electrically connected in parallel to provide a dual strain gauge in which each of the gauge elements is subjected to the same stress. A study of the graph of FIGURE 4 shows that if the absolute values of the gauge factors of each of the two gauge elements are similar, the strain gauge will have a very low resultant gauge factor. To provide a high resultant gauge factor, a P type gauge element having a high individual gauge factor may be combined with a suitable N type gauge element having a low individual gauge factor, or vice versa. Since the piezoresistance effect of semiconductor materials varies greatly with crystallographic orientation, it is apparent that proper selection of crystallographic orientations will provide the desired results, assuming that the individual P and N type gauge elements can be otherwise properly matched. As a matter of fact, it has been found extremely difficult to properly match up P and N type gauge elements having similar resistivities when both of the P and N type elements are of the particular crystallographic orientation which results in a maximum gauge factor (P type silicon of [111] crystallographic orientation and N type silicon of [100] crystallographic orientation).

It is recognized that a significant degree of mismatch between the P and N gauge elements could be compensated for, in varying degrees of effectiveness, by operating the parallel connected gauge elements from a constant current source. However, in practice, a constant current source is not as readily available or as convenient to use as a constant voltage source, particularly with the advent of the Zener diode which permits very simple regulation of voltage to strain gauge devices. Constant current regulation, on the other hand, is relatively complicated except for the inefficient system of utilizing a high voltage supply in conjunction with a series resistor. It is therefore desirable to provide strain gauges operable from a constant voltage source and having sensitivities relatively independent of temperature.

An example of the effectiveness of the gauge factor compensation method of the present invention will now be given. A semiconductor strain gauge in the form of a P type silicon rod of 0.1 ohm-cm. resistivity and of a [111] crystallographic orientation along its longitudinal axis was selected. Its gauge factor as a function of temperature was measured for loadings of 20 grams and 100 grams, the results being presented in following Table I:

*Table I*

| Temperature (° C.) | Tensile Load (gm.) | $R_\rho$ ($\Omega$) | $\Delta R_\rho$ ($\Omega$) | $\dfrac{\Delta R_\rho}{R_\rho}$ (percent) |
|---|---|---|---|---|
| −78 | 20 | 1,776 | 253 | 14.3 |
| −78 | 100 | 2,029 | | |
| 0 | 20 | 1,525 | 184 | 12.1 |
| 0 | 100 | 1,709 | | |
| 50 | 20 | 1,592 | 177 | 11.1 |
| 50 | 100 | 1,769 | | |
| 100 | 20 | 1,735 | 178 | 10.3 |
| 100 | 100 | 1,913 | | |
| 150 | 20 | 1,969 | 184 | 9.35 |
| 150 | 100 | 2,153 | | |

The measurements were made at specific temperature intervals between −78° C. and 150° C. as shown in the first column. Measurements were made at each temperature for two specific loadings, 20 grams and 100 grams, as shown in the second column. The gauge resistance, $R_\rho$, for each of the two loadings at each temperature is recorded in the third column. The resistance change, $\Delta R_\rho$, resulting from the load change from 20 to 100 grams is plotted in the fourth column. The percentage resistance change, $$\frac{\Delta R_\rho}{R_\rho}$$

(which is equal to the gauge factor for unit strain) is recorded in the fifth column, the figures representing the percentage resistance change from the gauge resistance subjected to a 20 gram tensile load. The fifth column of Table I illustrates how the gauge factor decreases with increasing temperature.

As pointed out hereinabove, since a P type gauge element of high gauge factor was chosen, the N type gauge element should be of a relatively low gauge factor. Since the N type gauge element is to be connected electrically in parallel with the P type gauge element, it is preferable that the N type gauge element have a relatively high resistance so that the resultant gauge resistance, and hence its output, will not be too low. To achieve a high element resistance without a great increase in element size, the resistivity of the N type gauge element should be significantly higher than that of the P type gauge element. Accordingly, a gauge element of N type silicon of 10 ohm-cm. resistivity and of a [111] crystallographic orientation along its longitudinal axis, was selected and electrically connected in parallel with the aforementioned P type gauge element. In order that both of the gauge elements will be subjected to the same loading, the gauge elements should be maintained in parallel alignment. Thus, the gauge elements may be placed in an end-to-end relationship similar to the orientation shown in FIGURE 4 or they may be maintained in parallel side-by-side relationship. The dual gauge may be either of the bonded or unbonded type, as long as both of the gauge elements are subjected to the same loading. Upon testing of the dual gauge consisting of the parallel connected P and N type gauge elements, the results shown in following Table II were obtained:

*Table II*

| Temperature (°C.) | Tensile Load (gm.) | $R_P$ (Ω) | $R_N$ (Ω) | R (Ω) | ΔR (Ω) | $\frac{\Delta R}{R}$ (percent) |
|---|---|---|---|---|---|---|
| −78 | 20 | 1,776 | 1,450 | 798 | 55 | 6.90 |
| −78 | 100 | 2,029 | 1,440 | 843 | | |
| 0 | 20 | 1,525 | 2,526 | 952 | 64 | 6.73 |
| 0 | 100 | 1,709 | 2,504 | 1,016 | | |
| 50 | 20 | 1,502 | 3,470 | 1,091 | 78 | 7.15 |
| 50 | 100 | 1,769 | 3,448 | 1,169 | | |
| 100 | 20 | 1,735 | 4,608 | 1,261 | 81 | 6.43 |
| 100 | 100 | 1,913 | 4,546 | 1,342 | | |
| 150 | 20 | 1,969 | 6,500 | 1,512 | 99 | 6.55 |
| 150 | 100 | 2,153 | 6,436 | 1,611 | | |

The first three columns of Table II correspond with the first three columns of Table I. The fourth column of Table II shows the resistance, $R_N$, of the N type gauge element at the various temperatures and loadings. The fifth column of Table II shows the resultant gauge resistance, R, representing the parallel combination of the P and N type gauge elements. The sixth column of Table II shows the resistance change, ΔR, of the resultant gauge at each temperature for a change in loading from 20 to 100 grams. The seventh column of Table II shows the percentage resistance change, $$\frac{\Delta R}{R}$$

of the gauge upon a change in gauge loading from 20 to 100 grams. A comparison of the results shown in Tables I and II illustrates the effectiveness of the gauge factor compensation.

By utilizing P and N type gauge elements of the same crystallographic orientation, an advantage results in that the two gauge elements may be formed within a single unitary semiconductor crystal. An illustrative embodiment of this type of structure is shown in FIGURE 6, the gauge of FIGURE 6 being of the unbonded type. The gauge is fabricated from a silicon rod 50 having a [111] crystallographic orientation along its longitudinal axis. The rod 50 is of N type silicon of 10 ohm-cm. resistivity and defines a main body portion 51 and end portions 52 and 53. The peripheral surfaces of the main body portion 51 is of P type conductivity while the surfaces of the end portions 52 and 53 are of N type conductivity. This desired configuration is easily obtainable by diffusing atoms of a P type impurity into the surfaces of the N type rod 50 and then etching or lapping the end portions 52 and 53 to remove the P type layer and expose the underlying N type material. Suitable diffusion and etching techniques are well known in the art and hence will not be discussed in detail. A coupling loop 55 is provided at one end of the gauge by ohmically bonding, such as by alloying, for example, the ends of a short wire to the N type end portion 52. A coupling loop 56 is similarly provided on the opposite end portion 53.

The P type surface region 54 in the main body portion 51 is electrically isolated from the remaining N type conductivity silicon by the high impedance barrier formed by the PN junction therebetween. Hence, the P type surface region 54 forms the P type gauge element while the remainder of the rod 50 forms the N type gauge element. One end of an electrical lead 57 is bonded to the coupling loop wire 56 to provide electrical connection to the N type surface of the end portion 53. One end of an electrical lead 58 is bonded to the P type surface region 54 near the end portion 53 to provide electrical contact to one end of the P type gauge element. An electrical lead 59 is bonded to the P type surface region 54 near the end portion 52 and also to the N type surface of the end portion 52 to electrically interconnect an end of both of the P and N type gauges. Thus, interconnection of the electrical leads 57 and 58 will electrically connect the P and N type gauge elements in parallel. If the electrical leads 57 and 58 are not interconnected, the P and N type gauge elements are electrically connected in series, connection to the P type gauge being made between the electrical leads 58 and 59 and connection to the N type gauge being made between the electrical leads 57 and 59. Thus, the structural embodiment shown in FIGURE 6 is also usable in conjunction with the first concept of the present invention, wherein series connected P and N gauges are utilized in adjacent legs of a bridge circuit. It is apparent that since both of the P and N gauge elements in the embodiment of FIGURE 6 are of identical crystallographic orientation that a compromise orientation must be selected when using the gauge elements in series. For example, a crystallographic orientation of [110] along the longitudinal axis of the rod is satisfactory for silicon. Of course, with such a compromise orientation, the bridge output will be significantly reduced. Other combinations are also possible. For example, with other crystallographic orientations, one gauge element may be so low in gauge factor that it functions merely as a temperature dependent resistor in series, or in parallel if so connected, with an active gauge. This effect may be utilized to advantage in some certain applications. The structural embodiment of FIGURE 6, produced through the use of diffusion techniques, results in a unitary body with no physical distinctions or discontinuities present therein while the P and N regions form separate gauge elements which are electrically isolated from each other. Since both of the gauge elements are part of an integral structure, they are both subjected to the same temperature and strain. The use of the diffusion technique with a single unitary semiconductor crystal can provide other equally advantageous structural forms. For example, the unitary semiconductor crystal could be formed in a flat configuration suitable for bonding to strain surfaces. In such flat bar type configurations, the P type region may be diffused into one or more faces of the bar or in the form of a longitudinal strip in only one face of the bar.

In FIGURE 7 of the drawing, there is illustrated a bridge circuit utilizing the first and second concepts of the present invention to render the bridge sensitivity relatively independent of temperature. The bridge circuit of FIGURE 7 is of the four-active arm type, utilizing semiconductor strain gauges 61 and 62 of P type silicon in opposing arms of the bridge circuit and semiconductor strain gauges 63 and 64 of N type silicon in opposing arms. The P type silicon gauges 61 and 62 are of [111] crystallographic orientation and the N type silicon gauges 63 and 64 are of [100] crystallographic orientation to provide a high bridge output. Two of the dual gauges of the embodiment illustrated in FIGURE 4 may be utilized to provide the four-active gauge elements, with the gauge elements 20 and 25 of one dual gauge corresponding to gauges 61 and 63, respectively, and the two elements of the second dual gauge corresponding to gauges 62 and 64. The junction between the gauge 61 and the gauge 64 is connected to an input terminal 65, and the junction between the gauge 62 and the gauge 63 is connected to another input terminal 66. The junction between the gauge 62 and the gauge 64 is connected to an output terminal 67, and the junction between the gauge 61 and the gauge 63 is connected to another output terminal 68. Coupling of a constant voltage source, not shown, to the input terminals 65 and 66 provide the bridge input voltage, $E_{in}$. Coupling of a voltmeter or other voltage-sensitive electrical indicating device, not shown, to the output terminals 67 and 68 allows measurement of the bridge output voltage, $E_{out}$. Th bridge circuit of FIGURE 7 is thus similar to the well-known prior art bridge circuit configuration utilizing semiconductor gauge elements of the same conductivity type in opposite arms of the bridge circuit, with the exception of the addition of a span compensation resistance 69 connected at one end to the junction between the gauge 61 and the gauge 63 and at the other end to the junction between the gauge 62 and the gauge 64. In accordance with the preceding discussion concerning gauge factor temperature compensation, the span compensation resistance 69 is in the form of an N type silicon crystal element of 10 ohm-cm. resistivity and of [111] crystallographic orientation. Due to the crystallographic orientation of this N type silicon crystal, its gauge factor is so low in comparison with the gauges 61, 62, 63 and 64 that it functions merely as a temperature dependent resistor effectively in parallel with each of the gauges to thereby provide the desired gauge factor compensation in accordance with the second concept of the present invention.

In FIGURE 8 of the drawing, there is illustrated a 4-active arm bridge circuit incorporating both the first and second novel concepts of the present invention in a different manner. Each of the active arms of the bridge circuit consists of a dual strain gauge comprising parallel connected P and N semiconductor gauge elements, the dual strain gauges being generally indicated by the reference numerals 71–74. The dual gauge 71 comprises a P type silicon gauge element 76 connected in parallel with an N type silicon gauge element 77. The dual gauge 72 comprises a P type silicon gauge element 78 connected in parallel with an N type silicon gauge element 79. The dual gauge 73 comprises a P type silicon gauge element 81 connected in parallel with an N type silicon gauge element 82. The dual gauge 74 comprises a P type silicon gauge element 83 connected in parallel with an N type silicon gauge element 84. The junction between the dual gauges 71 and 72 is connected to an input terminal 86, and the junction between the dual gauges 73 and 74 is connected to another input terminal 87. The junction between the dual gauges 72 and 73 is connected to an output terminal 88, and the junction between the dual gauges 71 and 74 is connected to another output terminal 89. The bridge input voltage, $E_{in}$, is provided by connecting a constant voltage source to the input terminals 86 and 87. Measurement of the bridge output voltage, $E_{out}$, is accomplished by connection of a suitable electrical indicating instrument to the output terminals 88 and 89. Each of the dual gauges 71–74 are constructed in accordance with the hereinabove discussed second present invention concept wherein the crystallographic orientation, resistivity, and resistance of the individual P and N gauge elements are selected to provide a resultant gauge factor relatively independent of temperature. The dual gauges 71 and 73 are fabricated so that the gauge factors of the P type gauge elements are predominant, and the dual gauges 72 and 74 are fabricated so that the gauge factors of the N type gauge elements are predominant. In other words, the gauge elements 76 and 81 are fabricated from P type silicon of [111] crystallographic orientation, while the gauge elements 77 and 82 are fabricated from N type silicon also of [111] crystallographic orientation. Thus, the gauge factors of the P type gauge elements 76 and 81 will be approximately 50 times as great as the gauge factors of the N type gauge elements 77 and 82. Conversely, the N type gauge elements 79 and 84 are crystallographically oriented for maximum gauge factor while the P type gauge elements 78 and 82 are oriented for a low gauge factor. Thus, the advantages of both of the first and the second concepts of the present invenntion are realized, for each of the resultant gauges 71–74 has a resultant gauge factor relatively independent of temperature and yet the gauges in the adjacent arms of the bridge circuit have P and N elements of a crystallographic orientation oriented for maximum gauge factor connected in series. For example, the connection in series of the P type gauge element 76 with the N type gauge element 79 will provide the correct combination for temperature compensation of bridge zero balance when these gauge elements are of identical positive temperature coefficient and the resistivities are matched to give identical rates of resistance change with variations in temperature. Thus, in the selection of gauge elements for the four-active arm bridge circuit of FIGURE 8, one would begin by first selecting a pair of similar P type gauge elements 76 and 81 and then selecting matching N type gauge elements 79 and 84 having identical rates of resistance change with variation in temperature to the P type gauge elements 76 and 81. Next, the N type gauge elements 77 and 82 and P type gauge elements 78 and 83, all oriented for low gauge factor, are selected to provide the proper parallel combination of P and N gauge elements to give the desired temperature independent of gauge factor for the resultant dual gauges 71–74. Thus, the bridge circuit of FIGURE 8 is characterized both by temperature compensation of zero balance and by temperature compensation of bridge sensitivity through compensation of the resultant gauge factors of each of the dual gauges. Although the resultant gauge factors of each of the dual gauges 71–74 is relatively low, the use of a 4-active arm bridge circuit provides approximately double the output of a 2-active arm bridge circuit. Furthermore, although both of the gauge elements of each dual gauge must always be identically loaded with forces of the same magnitude and sense of stress (tensile or compression), the complete dual gauge may be operated either in tension or compression independent of how the other dual gauges in the bridge circuit are being stressed. Thus, the 4-active arm bridge embodiment of FIGURE 8 could alternatively be made up to four identical dual gauges with the gauges in one pair of opposing bridge arms being in tension and the gauges in the other opposing bridge arms being in compression.

Thus, there has been described novel semiconductor strain gauge configuration utilizing gauge elements of opposite conductivity types. In accordance with the first concept of the present invention, P and N type semiconductor crystal gauge elements are used in adjacent arms of a bridge circuit to provide temperature compensation of zero balance in conjunction with high bridge output. In accordance with a second concept of the present invention, P and N type gauge elements are connected in parallel to provide a dual strain gauge having a resultant gauge factor relatively independent of temperature. A combination of the first and second concepts provide a bridge circuit which is both temperature compensated for zero balance and for bridge sensitivity. Also, various combinations of the first and second concepts are usable in prior art bridge circuits. Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. A semiconductor strain gauge comprising, in combination:
    (a) an elongate unitary semiconductor crystal body of a predetermined crystallographic orientation, said crystal body defining a first region of one predetermined conductivity type, and a second region of opposite conductivity type, said first region and second region being electrically isolated, said first region defining a first semiconductor strain gauge element having a first gauge factor and said second region defining a second semiconductor strain gauge element having an opposite polarity gauge factor; and,
    (b) means electrically interconnecting said first and second gauge elements.

2. A semiconductor strain gauge comprising, in combination:
    (a) an elongate unitary semiconductor crystal body of a predetermined crystallographic orientation, said crystal body defining a longitudinal surface portion of one predetermined conductivity type with the remainder of said crystal body being of the opposite conductivity type, said longitudinal surface portion being electrically isolated from the remainder of said crystal body by the high impedance barrier formed by the junction therebetween, said longitudinal surface portion defining a first semiconductor strain gauge element and the remainder of said crystal body defining a second semiconductor strain gauge element, said first strain gauge element being of opposite gauge factor polarity from said second strain gauge element; and, (b) means electrically interconnecting said first and second gauge elements in parallel.

3. A semiconductor strain gauge comprising, in combination:

(a) an elongate unitary semiconductor crystal body of a predetermined crystallographic orientation, said crystal body defining a longitudinal surface portion of one predetermined conductivity type with the remainder of said crystal body being of the opposite conductivity type, said longitudinal surface portion being electrically isolated from the remainder of said crystal body by the high impedance barrier formed by the junction therebetween, said longitudinal surface portion defining a first semiconductor strain gauge element and the remainder of said crystal body defining a second semiconductor strain gauge element, said first strain gauge element being of opposite gauge factor polarity from said second strain gauge element; and (b) means electrically interconnecting said first and second gauge elements in series.

4. An unbonded semiconductor strain gauge comprising, in combination:

(a) a first elongate unitary crystal of P type silicon with a [111] crystallographic orientation and of a predetermined resistivity, said first crystal body having a first electrical contact ohmically bonded thereto proximate one end thereof and a second electrical contact ohmically bonded thereto proximate the other end thereof;

(b) a second elongate unitary crystal of N type silicon with a [100] crystallographic orientation and of a predetermined resistivity, said second crystal body having a third electrical contact ohmically bonded thereto proximate one end thereof and a fourth electrical contact ohmically bonded thereto proximate the other end thereof;

(c) mounting means maintaining said second elongate crystal in coaxial alignment with said first elongate crystal, said mounting means being secured to said other end of said first crystal and to said one end of said second crystal; and, (d) an electrical lead interconnecting said second and third electrical contacts.

5. A semiconductor strain gauge comprising, in combination:

(a) an elongate unitary crystal of P type silicon with a [111] crystallographic orientation, said crystal body defining a longitudinal surface portion of N type conductivity, said longitudinal N type surface portion being electrically isolated from the remainder of said P type silicon body by the high impedance barrier formed by the junction therebetween;

(b) first and second electrical contacts ohmically bonded to said longitudinal N type surface portion near opposite ends thereof;

(c) third and fourth electrical contacts ohmically bonded to said P type portion of said silicon crystal near opposite ends thereof;

(d) means electrically interconnecting said first and third electrical contacts; and, (e) means electrically interconnecting said second and fourth electrical contacts.

References Cited by the Examiner

UNITED STATES PATENTS

| | | | |
|---|---|---|---|
| 2,350,972 | 6/44 | Ruge | 73—88.5 X |
| 2,920,298 | 1/60 | Hines | 73—88.5 X |
| 2,939,317 | 6/60 | Mason | 73—141 X |
| 2,990,529 | 6/61 | Courtney-Pratt | 338—3 X |
| 3,031,634 | 4/62 | Vogt | 338—2 |
| 3,034,345 | 5/62 | Mason | 73—88.5 X |
| 3,046,782 | 7/62 | Laimins | 73—88.5 X |
| 3,102,420 | 9/63 | Mason | 73—88.5 |

OTHER REFERENCES

Sanchez et al.: I.S.A. Fall Instrument-Automation Conference and Exhibit, preprint No. 46–LA61, pp. 1–19, Sept. 11, 1961. (Copy in Div. 36.)

Sanchez et al.: I.S.A. Winter Instrument-Automation Conference and Exhibit, reprint No. 37–SL61, pp. 1–27, Jan. 17, 1961. (Copy in Div. 36.)

RICHARD C. QUEISSER, *Primary Examiner.*

ROBERT EVANS, *Examiner.*